(12) United States Patent
Ouchi

(10) Patent No.: US 10,469,812 B2
(45) Date of Patent: Nov. 5, 2019

(54) PROJECTION DISPLAY SYSTEM, INFORMATION PROCESSING APPARATUS, INFORMATION PROCESSING METHOD, AND STORAGE MEDIUM THEREFOR

(71) Applicant: CANON KABUSHIKI KAISHA, Tokyo (JP)

(72) Inventor: Akihiro Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 15/878,925

(22) Filed: Jan. 24, 2018

(65) Prior Publication Data

US 2018/0220113 A1 Aug. 2, 2018

(30) Foreign Application Priority Data

Feb. 1, 2017 (JP) .................................. 2017-016822

(51) Int. Cl.
*H04N 9/31* (2006.01)
(52) U.S. Cl.
CPC ......... *H04N 9/3182* (2013.01); *H04N 9/3185* (2013.01); *H04N 9/3194* (2013.01)
(58) Field of Classification Search
CPC .................................................. H04N 9/3182
See application file for complete search history.

(56) References Cited

U.S. PATENT DOCUMENTS

| 7,907,795 | B2 | 3/2011 | Hardy et al. | |
|---|---|---|---|---|
| 2004/0156024 | A1* | 8/2004 | Matsuda | H04N 9/3185 353/70 |
| 2008/0218434 | A1* | 9/2008 | Kelly | G02B 27/01 345/8 |
| 2009/0097697 | A1* | 4/2009 | Miyake | G06K 9/2027 382/100 |
| 2015/0103257 | A1* | 4/2015 | Nakashin | H04N 9/3185 348/746 |

FOREIGN PATENT DOCUMENTS

JP 3908255 B2 4/2007

* cited by examiner

*Primary Examiner* — Michael E Teitelbaum
(74) *Attorney, Agent, or Firm* — Canon U.S.A., Inc., IP Division

(57) ABSTRACT

A projection control apparatus includes an acquisition unit configured to acquire a captured image of a projection plane on which a first image is projected by a projection unit, a specification unit configured to specify an image projection area of the projection unit within the captured image acquired by the acquisition unit, an association unit configured to, in the captured image of the projection plane on which a second image different from the first image is projected by the projection unit, associate coordinates on the image projection area specified by the specification unit with coordinates managed by the projection unit, and a control unit configured to calculate distortion correction parameter for the projection unit by using an association result of the between the coordinates by the association unit. The projection control apparatus can reduce the time for adjustment of a projection image shape.

10 Claims, 7 Drawing Sheets

PROJECTION & CAPTURING →

CAPTURED IMAGE

AREA SPECIFICATION INFORMATION →

PROJECTION DISPLAY AREA

PROJECTION DISPLAY SYSTEM, INFORMATION PROCESSING APPARATUS, INFORMATION PROCESSING METHOD, AND STORAGE MEDIUM THEREFOR

BACKGROUND

Field of the Disclosure

The present patent application relates to a projection display system, an information processing apparatus, an information processing method, and a storage medium storing instructions for controlling the projection display system.

Description of Related Art

In recent years, a projection display system using a single or a plurality of projection display apparatuses has been permanently installed at large public venues, such as amusement facilities or museum exhibitions, for observation by numerous viewers from a wide range of viewing angles. One issue with such permanently installed projection display systems is the initial installation of the projection display apparatuses and manual adjustment of a projection image shape for maintenance of display images at the time of the initial installation. The manual adjustment requires a great deal of expertise and manpower. In view of this, there has been known a technique to project an adjustment pattern by a projection display apparatus, capture an image of the adjustment pattern by a camera, and produce an adjustment parameter to adjust a projection shape on a screen (Japanese Patent No. 3908255).

According to Japanese Patent No. 3908255, the adjustment pattern is an image of known coordinates indicating sparkle points or crosses aligned at regular intervals or grid patterns. However, it is difficult to detect the coordinates closely on a display plane from such an image.

An image discussed in U.S. Pat. No. 7,907,795 includes a plurality of at least partially overlapping two-dimensional sub-patterns. The two-dimensional sub-patterns are anharmonic (not harmonic) to each other and repeated at different spatial periods.

FIG. 7 is a diagram illustrating images discussed in U.S. Pat. No. 7,907,795. Referring to FIG. 7, first, second, and third sub-patterns 410, 420, and 430 are all overlapped to form an image 440. The image 440 constitutes a part of an image 450 in which images with repetition of the sub-patterns in their respective sizes are overlapped on the entire display screen.

An area of the size covering the first to third sub-patterns is extracted from the image 450 and is analyzed to determine respective two-dimensional offsets for the first to third sub-patterns. The two-dimensional coordinates of the extracted position are determined from the determined two-dimensional offsets.

Accordingly, the coordinates of the image on the projection display apparatus can be specified by projecting an adjustment image for the projection display apparatus and extracting to analyze an arbitrary area of the image captured from a projected image. That is, distortion correction processing for adjusting the shape of the image projected by the projection display apparatus can be performed by projecting the image as illustrated in FIG. 7 with the projection display apparatus and using a captured image obtained by capturing its projection plane.

However, an image projected by the projection display apparatus discussed in U.S. Pat. No. 7,907,795 may be seen on an image captured by a camera at different positions depending on the positional relationship between the projection display apparatus and the camera. That is, using the captured image as it is, and extracting an area without the projected display image for coordinate analysis, for example, would lead to an increase in time for adjustment.

SUMMARY OF THE DISCLOSURE

A projection control apparatus includes an acquisition unit configured to acquire a captured image of a projection plane on which a first image is projected by a projection unit, a specification unit configured to specify an image projection area of the projection unit within the captured image acquired by the acquisition unit, an association unit configured to, in the captured image of the projection plane on which a second image different from the first image is projected by the projection unit, associate coordinates on the image projection area specified by the specification unit with coordinates managed by the projection unit, and a control unit configured to execute distortion correction processing for the projection unit by using an association result between the coordinates by the association unit.

Further features and advantages of the present patent application will become apparent from the following description of exemplary embodiments with reference to the attached drawings.

DESCRIPTION OF THE EMBODIMENTS

Hereinafter, exemplary embodiments of the present disclosure will be described with reference to the drawings.

Figure 1:
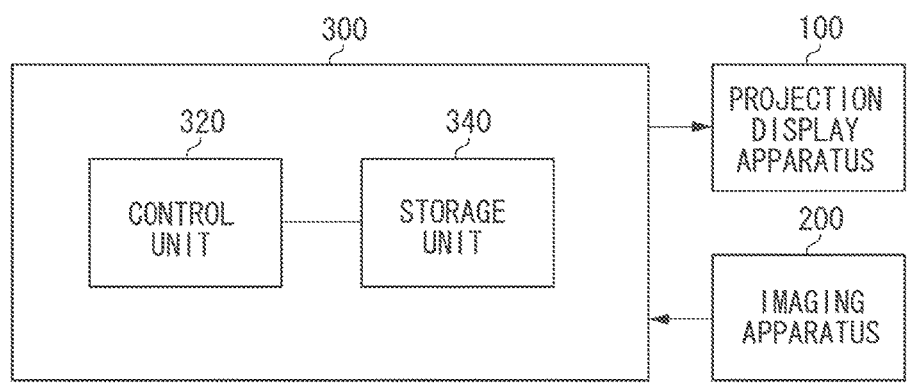
FIG. 1 is a block diagram illustrating an example of a system configuration of an image display system according to a first exemplary embodiment.

FIG. 1 is a diagram illustrating an example of a system configuration of an image display system according to a first exemplary embodiment. The image display system includes a projection display apparatus 100, an imaging apparatus 200, and a computer 300. The projection display apparatus 100 is a projector that projects an image for adjustment of a projection image shape generated by the computer 300. The imaging apparatus 200 is, for example, a camera which captures a projected image for adjustment of a projection image shape. The computer 300 includes a control unit 320 having a central processing unit (CPU), and a storage unit 340 having a read only memory (ROM) and a random access memory (RAM). The control unit 320 controls the projection display apparatus 100 and the imaging apparatus 200 as well as the computer 300. The storage unit 340 stores programs for controlling operations of the control unit 320, stores image data captured by the imaging apparatus 200, and stores other data either temporarily or permanently. The control unit 320 executes processing based on the programs stored in the storage unit 340 to implement software processing of the computer 300 illustrated in FIG. 2 as described below and implement the processes in the flowcharts of FIGS. 3 and 6. The projection display apparatus 100 and the imaging apparatus 200 each include a control unit, a storage unit, and other hardware units, and each control unit executes processing based on programs stored in the storage unit to implement the respective functions of the apparatuses. Alternatively, the projection display apparatus 100 can be integrated with at least one of the imaging apparatus 200 and the computer 300.

Figure 2:
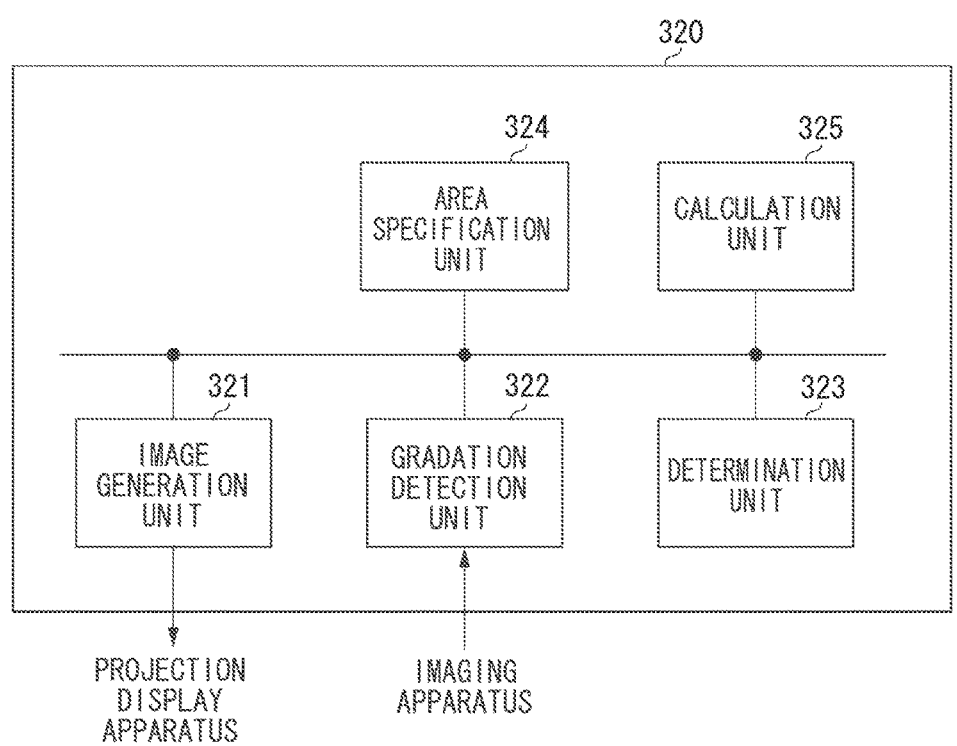
FIG. 2 is a block diagram illustrating an example of a functional configuration of a computer implemented by software algorithms described herein.

FIG. 2 is a block diagram illustrating an example of a functional configuration of the computer 300 implemented by software algorithms described herein. The computer 300 includes an image generation unit 321, a gradation detection unit 322, a determination unit 323, an area specification unit 324, and a calculation unit 325 as a software configuration.

The image generation unit 321 generates a full-screen solid image with a predetermined gradation, for example.

The gradation detection unit 322 receives an image, which is generated by the image generation unit 321, projected by the projection display apparatus 100, and then captured by the imaging apparatus 200, and detects a gradation of the projected image in the received image (captured image). The gradation of the projected image can be detected from the gradation existing in the entirety of the projected image or in only part of the projected image. For example, the gradation of the projected image can be detected from about 50% of a whole capturing range. In this case, the value of 50% is based on the premise that the projection display apparatus 100 and the imaging apparatus 200 are disposed such that a capturing area of the projected image accounts for 50% or more of the whole capturing range of the imaging apparatus 200, but the value of the gradation can be detected in various other ways, for example, from more than one capturing area. As used herein, gradation (or image gradient) refers to its ordinary meaning as a directional change in the intensity or color of an image, where each pixel of a gradient image measures the change in intensity in a given direction.

The determination unit 323 determines whether a projection display image captured by the imaging apparatus 200 has been properly captured. In other words, the determination unit 323 determines whether the gradation of the projected image is proper. For example, when a maximum value of the gradation detected by the gradation detection unit 322 is equal to a maximum gradation of the captured image, there is a high possibility that the captured image is saturated, and the determination unit 323 thus determines that the captured image is not proper. When the maximum value of the gradation detected by the gradation detection unit 322 is less than the maximum gradation of the captured image, the captured image is not saturated and the determination unit 323 thus determines that the captured image is proper.

The method of determination by the determination unit 323 is not limited to the foregoing one. For example, the determination unit 323 can determine that the captured image is proper in a case where the gradation detected by the gradation detection unit 322 falls within a preset range, and can determine that the captured image is not proper in a case where the gradation detected by the gradation detection unit 322 does not fall within the preset range. In addition, the determination unit 323 can use a value different from the maximum gradation of the captured image as a threshold for comparison with the gradation detected by the gradation detection unit 322. The threshold can be a fixed value or can be changeable as appropriate according to a user's operation or a projection environment, for example.

In the foregoing example, when the maximum value of the gradation detected by the gradation detection unit 322 is equal to the maximum gradation of the captured image, the determination unit 323 determines that the captured image is not proper (the gradation of the projected image is not proper). However, the determination method is not limited to this. For example, when the gradations of a plurality of pixels detected by the gradation detection unit 322 are aligned in descending order and the gradation at a predetermined rank in the order (for example, the tenth gradation) is equal to the maximum gradation (for example, 255) of the captured image, the determination unit 323 can determine that the captured image is not proper. Employing this configuration makes it possible to determine that the projection display image is properly captured, for example, when only some of the pixels in the captured image have the maximum gradation of the captured image.

The area specification unit 324 specifies a projection display area of the captured image. For example, the area specification unit 324 binarizes, by a predetermined threshold, the captured image as to which the projection display image is determined to be proper by the determination unit 323, and specifies an area with a value of 1 as an area where the projection display image is captured. The calculation unit 325 refers to a result of specification of the projection display area by the area specification unit 324 to associate coordinates on the captured image with coordinates managed by the projection display apparatus 100 for controlling the position of the projected image (hereinafter, referred to as coordinates on the projection display apparatus 100). When the association, as to which position of the coordinates (x, y) on the captured image are a projected position of the coordinates (x, y) on the projection display apparatus 100, can be made, a parameter for adjusting a projection image shape by the projection display apparatus 100 can be calculated by a publicly known technique. For example, in a case of a projected image on a plane screen, a homography matrix of a captured image and a projected image can be calculated by associating the coordinates on the captured image with the coordinates on the projection display apparatus 100. Further, a normal line of the plane screen can be estimated from the homography matrix. Using the estimated normal line of the plane screen, a parameter for adjusting the projected image such that its shape becomes a rectangle, viewed from the normal line of the plane screen, can be calculated.

In the description of the present exemplary embodiment, FIG. 2 illustrates the functional configuration implemented by computer 300 executing software algorithms. However, some or all functional components of the configuration illustrated in FIG. 2 can be implemented as a hardware configuration in the computer 300.

Figure 3:
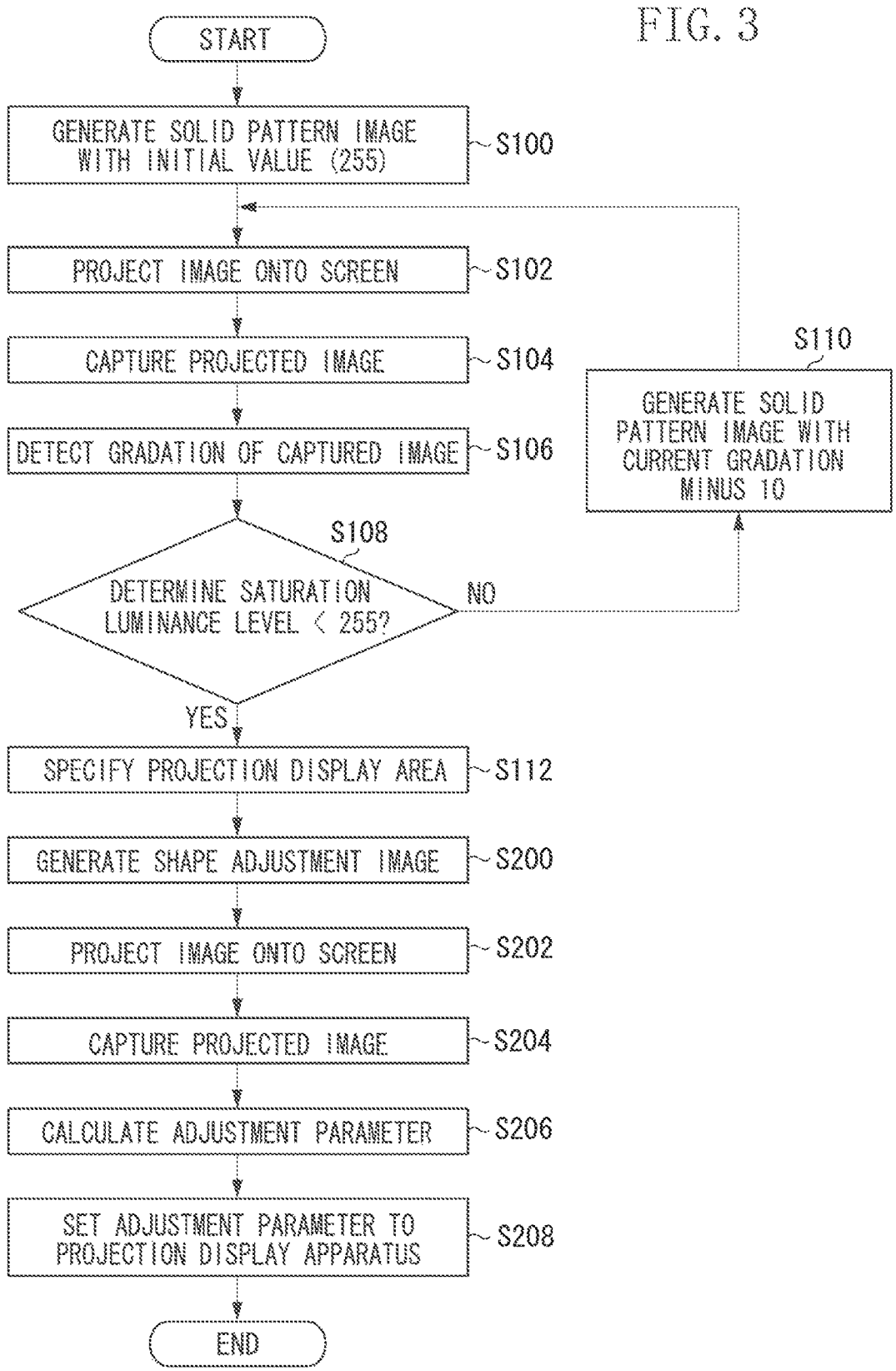
FIG. 3 is a flowchart of an example of information processing according to the first exemplary embodiment.

FIG. 3 is a flowchart of an example of information processing for adjusting the projection shape of an image according to the first exemplary embodiment. The following description is based on the premise that the processing in the computer 300 is performed by the control unit 320, for the sake of simplification of explanation.

In step S100, the control unit 320 generates a full-screen solid image with the maximum gradation, for example, as an image from which the projection area is determinable. The image generated here should at least be an image from which the gradation can be roughly detected, and may partially include an arbitrary pattern.

In step S102, the control unit 320 transfers the image generated in step S100 to the projection display apparatus 100. The projection display apparatus 100 projects an input image onto a display plane (a screen).

In step S104, the imaging apparatus 200 captures an image of the projected image, and the control unit 320 acquires a captured image from the imaging apparatus 200. The captured image is an image captured by the imaging apparatus 200 from the screen on which an image is projected by the projection display apparatus 100. The control unit 320 stores data of the acquired captured image in the storage unit 340.

In step S106, the control unit 320 detects, in at least part of the captured image, the gradation of a projected image. The control unit 320 detects the gradation in about 50% of the whole capturing range as the gradation of the projected image. In this case, the value of 50% is based on the premise that the projection display apparatus 100 and the imaging apparatus 200 are disposed such that the capturing area of the projected image accounts for 50% or more of the whole capturing range of the imaging apparatus 200, but the value of tine gradation can be detected a larger or smaller capturing area. As used, herein, gradation (or image gradient) refers to its ordinary meaning as a directional change in the intensity or color of an image, where each pixel of a gradient image measures the change in intensity in a given direction.

In step S108, the control unit 320 determines whether the gradation of the projected image is proper. In other words, the control unit 320 determines whether to change the gradation of the image to be projected by the projection display apparatus 100 based on the gradation detected from the captured image. For example, in a case where the gradation detected by the gradation detection unit 322 (for example, the maximum value in the luminance level) is equal to the maximum gradation of the captured image (for example, 255), there is a high possibility that the captured image is saturated and the control unit 320 thus determines that the gradation of the projected image is to be changed. In a case where the gradation detected by the gradation detection unit 322 is less than the maximum gradation, the control unit 320 determines that the gradation of the projected image is not to be changed.

The determination method in step S108 is not limited to the foregoing one. For example, the determination unit 323 can determine that the captured, image is proper (the gradation of the projected image is not to be changed) in a case where the gradation detected by the gradation detection unit 322 falls within a preset range, and can determine that the captured image is not proper (the gradation of the projected image is to be changed) in a case where the gradation detected by the gradation detection unit 322 falls outside the range. In addition, the determination unit 323 can use a value different from the maximum gradation of the captured image as a threshold for comparison with the gradation detected by the gradation detection unit 322. The threshold can be a fixed value or can be changeable as appropriate according to a user's operation or a projection environment, for example.

In the foregoing example, when the maximum value of the gradation detected by the gradation detection unit 322 is equal to the maximum gradation of the captured image, the determination unit 323 determines that the captured image is not proper (the gradation of the projected image is to be changed). However, the determination method is not limited to this. For example, when the gradations of a plurality of pixels detected by the gradation detection unit 322 are aligned in descending order and the gradation at a predetermined rank in the order (for example, the tenth gradation) is equal to the maximum gradation (for example, 255) of the captured image, the determination unit 323 can determine that the captured image is not proper. Employing this configuration makes it possible to determine that the projection display image is properly captured, for example, when only some of the pixels in the captured image have the maximum gradation of the captured image.

When the gradation of the projected image is less than the maximum gradation, the captured image is not saturated, and the control unit 320 thus determines that the gradation of the projected image is proper. In a case where the control unit 320 determines that the gradation of the projected image is not proper (NO in step S108), the processing proceeds to step S110. In a case where the control unit 320 determines that the gradation of the projected image is proper (YES in step S108), the processing proceeds to step S112.

In step S110, the control unit 320 generates an image with a change in the gradation of the projected image. For example, the control unit 320 generates an image with a gradation obtained by subtracting a predetermined gradation from the gradation of the current projected image. The generated image here may not be identical to the current projected image as long as the generated image is generally changed in gradation. That is, in steps S102 to S110, the control unit 320 changes the gradation of the image to be projected by the projection display apparatus 100 depending on the gradation detected from the captured image of the screen on which the image is projected by the projection display apparatus 100. The processing in step S110 is an example of processing for changing the gradation of the image. The control unit 320 repeats the processing of steps S110, S102, S104, S106, and S108 until determination that the gradation of the projected image is proper is made. Finally, the control unit 320 determines, as proper, the maximum gradation of the projected image in which the gradation of the captured image detected in step S106 is less than the maximum gradation allowing capturing.

In the configuration described above, the processing of steps S110, S102, S104, S106, and S108 is repeated to decrease the gradation in sequence from the maximum value, and it is determined whether the captured image is proper depending on whether the gradation of the projection display image in the captured image is equal to the maximum gradation. However, the determination method is not limited to this. For example, the control unit 320 can increase the gradation of the generated image in sequence from an arbitrary intermediate gradation of the generated image in step S100. The control unit 320 can change the gradation in step S110 by subtracting or adding the gradation corresponding ½ of a difference from the previous gradation to come close, by an asymptotic method, to a boundary value at which the captured image is saturated. In this case, the control unit 320 cannot determine whether the captured image is proper in step S108 simply by the gradation alone, but determines in combination with the difference from the gradation before value change, for example. The processing of steps S106, S108, and S110 can be omitted.

In step S112, the control unit 320 specifies a projection display area from the captured image of the screen on which the image is projected by the projection display apparatus 100. More specifically, for example, the control unit 320 binarizes the gradation value of each pixel in the captured image by a predetermined threshold, and specifies the area with a value of 1 as an area where the projection display image is captured, that is, the projection display area. Alternatively, the control unit 320 can specify the projection display area by another index such as a luminance value. The relationship between the captured image and the projection display area will be described below with reference to FIGS. 4A to 4C.

Figure 4A:
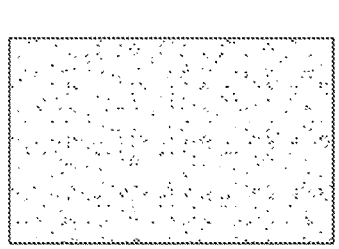
FIGS. 4A, 4B and 4C are diagrams illustrating an example of projecting an image.

In step S200, the control unit 320 generates an image with a pattern as illustrated in FIG. 4A, as an adjustment image for adjusting the projection shape of the projected image.

In step S202, the control unit 320 transfers the adjustment image generated in step S200 to the projection display apparatus 100. The projection display apparatus 100 projects the adjustment image.

In step S204, the control unit 320 acquires from the imaging apparatus 200 a captured image of the screen on which the adjustment image is projected. The control unit 320 stores image data of the acquired captured image in the storage unit 340.

In step S206, the control unit 320 specifies image coordinates on the projection display apparatus 100 by analyzing the captured image corresponding to the projection display area specified in step S112, and associates the coordinates on the captured image with the coordinates on the projection display apparatus 100.

Figure 4B:
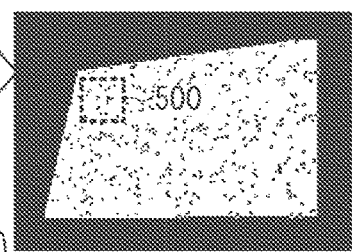
Figure 4C:
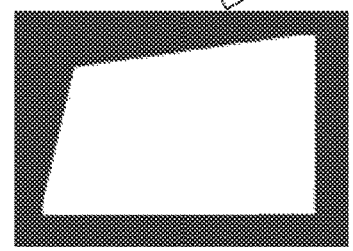

More specifically, when the captured image, which was obtained by imaging the screen on which the image illustrated in FIG. 4A is projected, is an image illustrated in FIG. 4B, the area specification unit 324 according to the present exemplary embodiment specifies a white solid area illustrated in FIG. 4C as the projection display area in the captured image. Then, the control unit 320 extracts a predetermined area (for example, an area 500 in FIG. 4B) in the projection display area specified by the area specification unit 324, and analyzes the area 500 to determine two-dimensional coordinates of the extracted position. When the association, as to which position of the coordinates (x, y) on the captured image are a projected position of the coordinates (x, y) on the projection display apparatus 100, can be made, the parameter for adjusting the projection shape of the image projected by the projection display apparatus 100 can be calculated by a publicly known technique. For example, in a case of a projected image on a plane screen, a homography matrix of a captured image and a projected image can be calculated by associating the coordinates on the captured image with the coordinates on the projection display apparatus 100. Further, a normal line of the plane screen can be estimated from the homography matrix. Using the estimated normal line of the plane screen, a parameter for adjusting the projected image such that its shape becomes a rectangle, viewed from the normal line of the plane screen, can be calculated. The parameter calculated by the control unit 320 may be a trapezoidal distortion correction parameter in the projection display apparatus 100, for example.

In step S208, the control unit 320 sets the adjustment parameter calculated in step S206 to the projection display apparatus 100, thereby terminating the information processing for adjusting the projection shape of the projected image. Step S208 is an example of processing for controlling a projection position by the projection display apparatus 100 based on the association between the coordinates on the captured image and the coordinates on the projection display.

The control unit 320 repeats the processing of steps S110, S102, S104, S106, and S108 to be able to specify the projected image area in the captured image with high accuracy. If the projected image is saturated in the captured image, a correct area of the projected image cannot be determined due to "bleeding" in the captured image. That is, even if the exposure setting of the imaging apparatus 200 may be somewhat excessive, it is possible to determine an area of the projected image with high accuracy, while eliminating the influence of such "bleeding" in the captured image.

As described above, according to the present exemplary embodiment, it is possible to determine with high accuracy an area of the projection display image in the captured image regardless of the exposure setting of the imaging apparatus 200. This allows efficient association between the coordinates on the captured image and the coordinates on the projection display apparatus 100, which is necessary to adjust a projected image shape of the projection display apparatus 100, thereby to reduce the processing time for adjustment of the projection image shape.

In the foregoing exemplary embodiment, after the processing of steps S100 to S110 described in FIG. 3, the processing of step S112 and subsequent steps is performed. For example, the processing of steps S103 and S110 may not be performed. However, performing the processing of steps S108 and S110 produces an effect of saving the user from having to adjust the solid pattern image depending on, for example, changes in an installation environment of the projection display apparatus 100.

Figure 5:
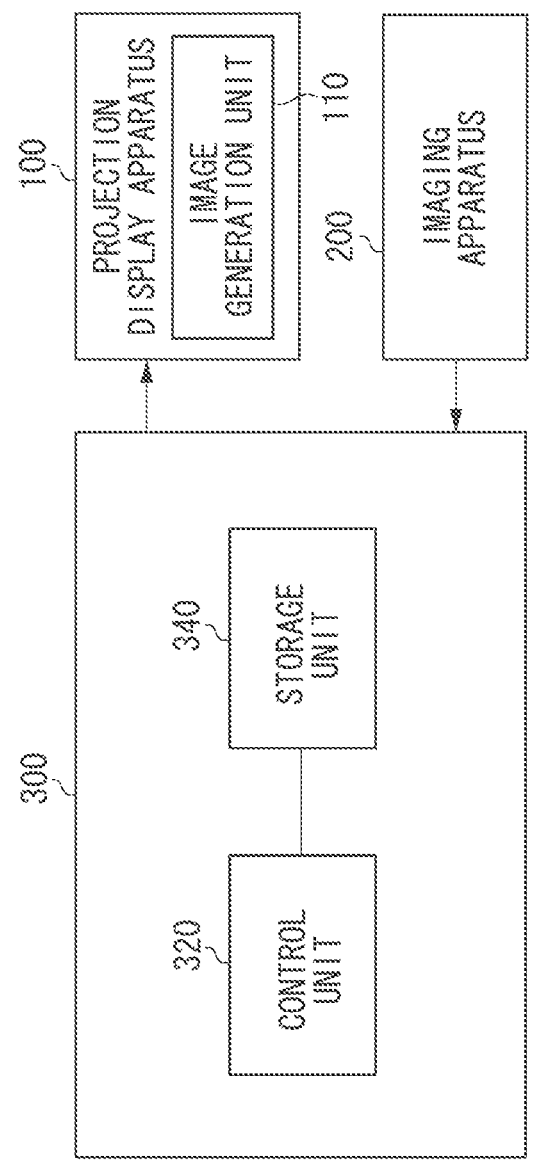
FIG. 5 is a diagram illustrating an example of a system configuration of an image display system according to a second exemplary embodiment.

In the image display system according to the first exemplary embodiment, the computer 300 includes the image generation unit 321, and the projection display apparatus 100 projects the image generated by the image generation unit 321. In a second exemplary embodiment, a projection display apparatus 100 includes an image generation unit 110 as illustrated in FIG. 5.

The image generation unit 110 generates a necessary image under instructions from a computer 300. In addition, the image generation unit 110 can read an image from a storage unit in the projection display apparatus 100, such as a RAM or a ROM, under instructions from the computer 300. The image generation unit 110 can be implemented as either hardware or software in the projection display apparatus 100.

Figure 6:
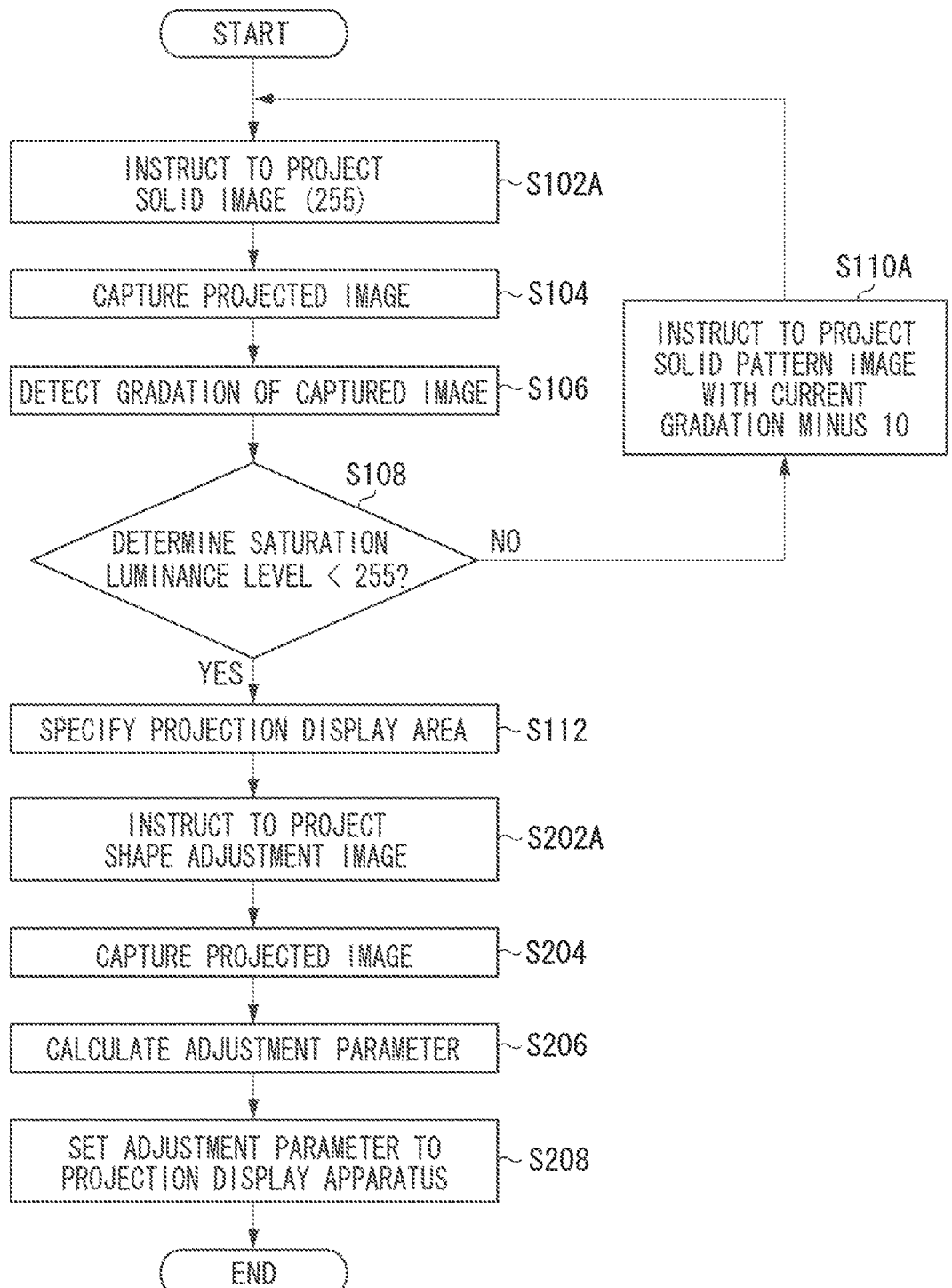
FIG. 6 is a flowchart of an example of information processing according to the second exemplary embodiment.
Figure 7:
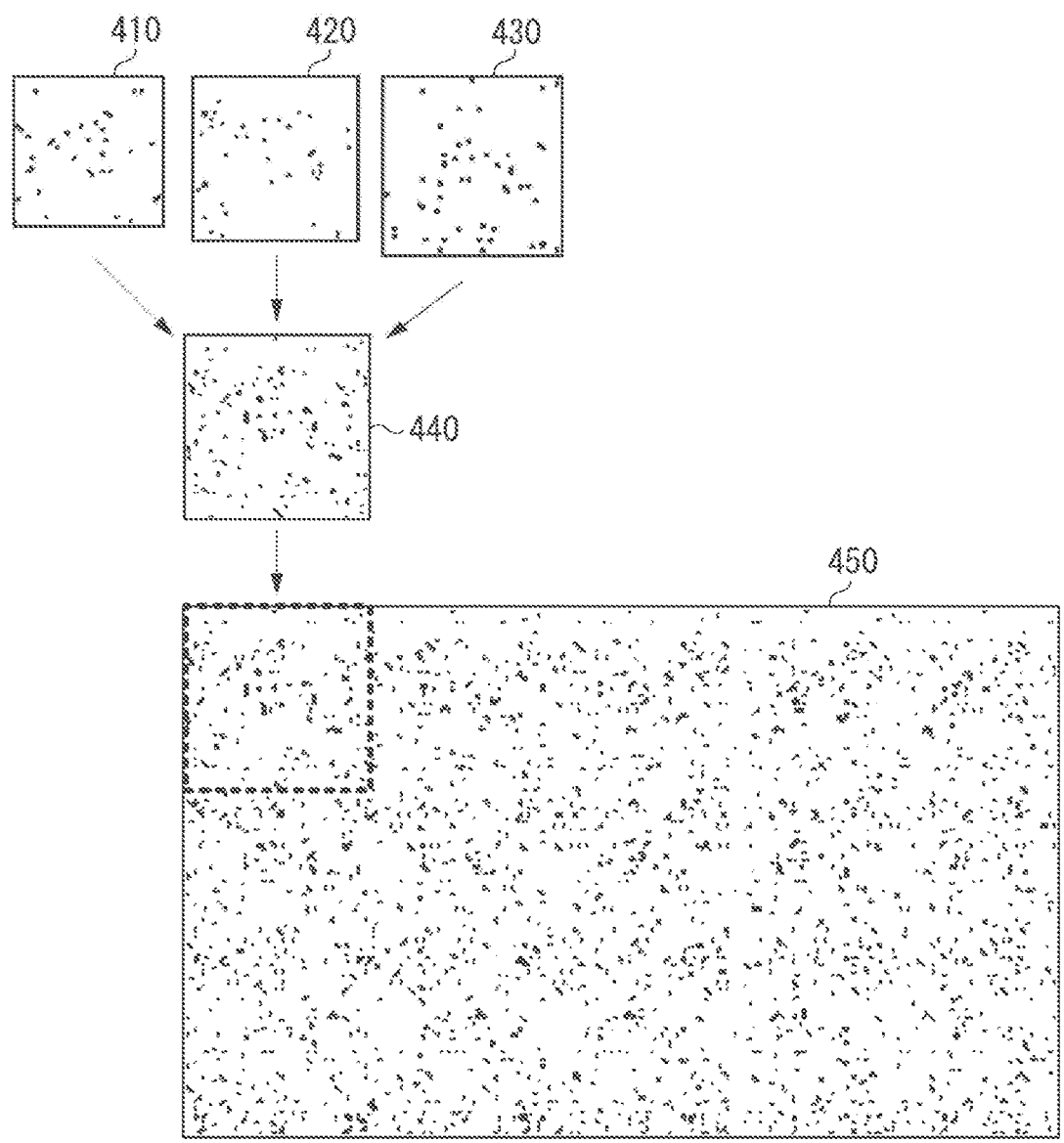
FIG. 7 is a diagram illustrating a process of combining different sub-patterns into an image as discussed in U.S. Pat. No. 7,907,795.

FIG. 6 is a flowchart of an example of information processing for adjusting a projection shape according to the second exemplary embodiment.

The differences between the processing in the flowchart according to the present exemplary embodiment and the processing in the flowchart according to the first exemplary embodiment are in steps S102A, S110A, and S202A. In steps S102A, S110A, and S202A, the projection display apparatus 100 generates a full-screen solid image or a shape adjustment image with an arbitrary gradation, and projects the image under instructions from the computer 300.

As described above, according to the present exemplary embodiment, the projection display apparatus 100 generates an image necessary for adjustment, which eliminates the need for transmission and reception of a video signal between the computer 300 and the projection display apparatus 100. This allows adjustment of the projection image shape with a simple configuration and in a short processing time.

In the foregoing exemplary embodiments, basically, the image generation unit 321 generates a full-screen solid image (an image with an entirely uniform gradation value), and the full-screen solid image is projected in step S102 described in FIG. 3. However, the image to be displayed in step S102 is not limited to a full-screen solid image but can be an image varying in gradation values depending on the image area. Alternatively, the user can be allowed to select as appropriate whether to use the full-screen solid image or the image varying in gradation values depending on the image area, as the image to be displayed in step S102.

In the foregoing exemplary embodiments, basically, the projection display apparatus 100, the imaging apparatus 200, and the computer 300 are different apparatuses. However, the present disclosure is not limited to this. For example, one projector can include all the functions of the projection display apparatus 100, the imaging apparatus 200, and the computer 300. Alternatively, one projector can include the functions of the projection display apparatus 100 and the computer 300, or can include the functions of the projection display apparatus 100 and the imaging apparatus 200.

Examples of the exemplary embodiments of the present disclosure have been described in detail so far. However, the present disclosure is not limited to the specific exemplary embodiments.

According to the processing in the exemplary embodiments, it is possible to determine with high accuracy an area of a projection display image in a captured image regardless of the exposure setting of a camera. This allows efficient association between coordinates on a camera image and coordinates on a projection display apparatus, which is necessary for adjusting a projected image shape of the projection display apparatus. Therefore, it is possible to implement an image display system that reduces the processing time for adjustment of a projection image shape.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-016822, filed Feb. 1, 2017, which is hereby incorporated by reference herein in its entirety.

What is claimed is:

1. A projection control apparatus comprising:
a projection unit configured to project a first image and a second image different from the first image; and
a storage medium storing instructions and a processor executing the instructions to function as:
an acquisition unit configured to acquire a first captured image of a projection plane on which the first image is projected by the projection unit and a second captured image of a projection plane on which the second image is projected by the projection unit;
a determination unit configured to determine whether to change gradation of the first image to be projected by the projection unit based on gradation detected from the first captured image;
a second control unit configured to, in a case where the determination unit determines that the gradation of the first image is to be changed, change the gradation of the first image to be projected by the projection unit;
a specification unit configured to specify an image projection area of the projection unit within the first captured image acquired by the acquisition unit in a case where the determination unit does not determine that the gradation is to be changed;
an association unit configured to associate, in the second captured image, coordinates on the image projection area specified by the specification unit with coordinates managed by the projection unit based on the second captured image; and
a first control unit configured to calculate a distortion correction parameter for the projection unit by using an association result between the coordinates by the association unit,
wherein the first image, gradation of which has been changed by the second control unit, is projected by the projection unit, and the acquisition of the first captured image by the acquisition unit and the determination by the determination unit are performed until the determination unit no longer determines that the gradation is to be changed, and the image projection area is specified using the first captured image, of which the determination unit has not determined that the gradation is to be changed.

2. The projection control apparatus according to claim 1, wherein, in a case where the determination unit determines that the gradation of the first image is to be changed, the second control unit changes the gradation of the first image, causes the projection unit to project the changed first image, acquires a captured image of a projection plane on which the changed first image is projected, and determines whether the gradation of the changed first image is to be further changed.

3. The projection control apparatus according to claim 1, wherein, in a case where the determination unit determines that the gradation of the first image is to be changed, the second control unit subtracts a predetermined gradation from the gradation of the first image projected by the projection unit.

4. The projection control apparatus according to claim 1, wherein the first image is entirely uniform in gradation and the second image is an image representing a plurality of points.

5. The projection control apparatus according to claim 1, wherein, in a case where there exists a pixel with a maximum gradation in the captured image, the determination unit determines that the gradation of the first image is to be changed.

6. A projection control method comprising:
projecting, using a projection unit, a first image and a second image different from the first image;
acquiring a first captured image of a projection plane on which the first image is projected by the projection unit and a second captured image of a projection plane on which the second image is projected by the projection unit;
determining whether to change gradation of the first image to be projected by the projection unit based on gradation detected from the first captured image;
in a case where the determining determines that the gradation of the first image is to be changed, changing the gradation of the first image to be projected by the projection unit;
specifying an image projection area of the projection unit within the acquired first captured image in a case where the determining does not determine that the gradation is to be changed;
associating, in the second captured image, coordinates on the specified image projection area with coordinates managed by the projection unit based on the second captured image; and
executing distortion correction processing by calculating a distortion correction parameter for the projection unit by using an association result between the coordinates,
wherein the first image, gradation of which has been changed by the changing, is projected by the projection unit, and the acquisition of the first captured image by the acquiring and the determination by the determining are performed until the determining no longer determines that the gradation is to be changed, and the image projection area is specified using the first captured image, of which the determining has not determined that the gradation is to be changed.

7. A non-transitory computer-readable storage medium storing a program for causing a computer to execute a projection control method comprising:
projecting, using a projection unit, a first image and a second image different from the first image;
acquiring a first captured image of a projection plane on which the first image is projected by the projection unit and a second captured image of a projection plane on which the second image is projected by the projection unit;
determining whether to change gradation of the first image to be projected by the projection unit based on gradation detected from the first captured image;
in a case where the determining determines that the gradation of the first image is to be changed, changing the gradation of the first image to be projected by the projection unit;
specifying an image projection area of the projection unit within the acquired first captured image in a case where the determining does not determine that the gradation is to be changed;
associating, in the second captured image, coordinates on the specified image projection area with coordinates managed by the projection unit based on the second captured image; and
executing distortion correction processing by calculating a distortion correction parameter for the projection unit by using an association result between the coordinates,
wherein the first image, gradation of which has been changed by the changing, is projected by the projection unit, and the acquisition of the first captured image by the acquiring and the determination by the determining are performed until the determining no longer determines that the gradation is to be changed, and the image projection area is specified using the first captured image, of which the determining has not determined that the gradation is to be changed.

8. The projection control apparatus according to claim 1, wherein the first image is entirely uniform in gradation, and
wherein the determination unit determines to change the gradation of the first image to be projected by the projection unit in a case that the detected gradation of the captured image does not satisfy a predetermined condition, and does not determine to change the gradation of the first image to be projected by the projection unit in a case that the detected gradation of the captured image satisfies the predetermined condition.

9. The projection control apparatus according to claim 8, wherein the determination unit determines to change the gradation of the first image to be projected by the projection unit in a case that a maximum value of the detected gradation is equal to a maximum gradation of the captured image, and does not determine to change the gradation of the first image to be projected by the projection unit in a case that the maximum value of the detected gradation is not equal to the maximum gradation of the captured image.

10. The projection control apparatus according to claim 1, wherein the first image is entirely uniform in gradation, and
wherein the determination unit determines to change the gradation of the first image to be projected by the projection unit in a case that the detected gradation of the captured image does not fall within a preset range, and does not determine to change the gradation of the first image to be projected by the projection unit in a case that the detected gradation of the captured image falls within the preset range.

* * * * *